(12) United States Patent
George et al.

(10) Patent No.: US 11,847,500 B2
(45) Date of Patent: Dec. 19, 2023

(54) SYSTEMS AND METHODS FOR PROVIDING MANAGEMENT OF MACHINE LEARNING COMPONENTS

(71) Applicant: Cisco Technology, Inc., San Jose, CA (US)

(72) Inventors: Johnu George, San Jose, CA (US); Sourav Chakraborty, Fremont, CA (US); Amit Kumar Saha, Bangalore (IN); Debojyoti Dutta, Santa Clara, CA (US); Xinyuan Huang, San Jose, CA (US); Adhita Selvaraj, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 540 days.

(21) Appl. No.: 16/710,499

(22) Filed: Dec. 11, 2019

(65) Prior Publication Data
US 2021/0182729 A1 Jun. 17, 2021

(51) Int. Cl.
*G06F 9/50* (2006.01)
*G06N 20/00* (2019.01)
(Continued)

(52) U.S. Cl.
CPC .......... *G06F 9/5044* (2013.01); *G06F 9/3836* (2013.01); *G06F 9/48* (2013.01);
(Continued)

(58) Field of Classification Search
CPC ........ G06F 9/48; G06F 9/4806; G06F 9/4843; G06F 9/4881; G06F 9/50; G06F 9/5011;
(Continued)

(56) References Cited

U.S. PATENT DOCUMENTS 11,134,013 B1* 9/2021 Allen ..................... G06F 9/5072
2009/0037524 A1* 2/2009 O'Rourke ............. H04L 63/083
709/228
(Continued)

FOREIGN PATENT DOCUMENTS

CN 109062700 12/2018

OTHER PUBLICATIONS

Wang et al, "Machine Learning for Networking: Workflow, Advances and Opportunities", IEEE network, Mar./Apr. 2018, pp. 92-99 (Year: 2018).*
(Continued)

*Primary Examiner* — Charles M Swift
(74) *Attorney, Agent, or Firm* — Polsinelli

(57) ABSTRACT

A method can include receiving, at a workflow controller, a machine learning workflow, the machine learning workflow associated with a first task and a second task. The first task is training a machine learning model and the second task is deploying the model. The method can include segmenting, by the workflow controller, the machine learning workflow into a first sub-workflow associated with the first task and a second sub-workflow associated with the second task, assigning a first workflow agent to the first sub-workflow and assigning a second workflow agent to the second sub-workflow, selecting, by the first workflow agent and based on first resources needed to perform the first task, a first cluster for performing the first task and selecting, by the second workflow agent and based on second resources needed to perform the second task, a second cluster for performing the second task.

16 Claims, 8 Drawing Sheets

(51) Int. Cl.
    *G06F 9/48*           (2006.01)
    *G06F 9/38*           (2018.01)
    *G06F 18/23213*    (2023.01)

(52) U.S. Cl.
    CPC .......... *G06F 9/4806* (2013.01); *G06F 9/4843* (2013.01); *G06F 9/4881* (2013.01); *G06F 9/50* (2013.01); *G06F 9/5005* (2013.01); *G06F 9/5011* (2013.01); *G06F 9/5022* (2013.01); *G06F 9/5027* (2013.01); *G06F 9/5038* (2013.01); *G06F 9/5055* (2013.01); *G06F 9/5061* (2013.01); *G06F 9/5077* (2013.01); *G06F 18/23213* (2023.01); *G06N 20/00* (2019.01)

(58) Field of Classification Search
    CPC .. G06F 9/5022; G06F 9/5027; G06F 9/50387; G06F 9/5044; G06F 9/5055; G06F 9/5061; G06F 9/5072; G06F 9/5077; G06N 20/00
    See application file for complete search history.

(56) References Cited

U.S. PATENT DOCUMENTS

| | | | | |
|---|---|---|---|---|
| 2012/0159506 | A1* | 6/2012 | Barham | G06F 9/5044 |
| | | | | 718/104 |
| 2014/0317617 | A1* | 10/2014 | O'Donnell | G06F 9/5027 |
| | | | | 718/1 |
| 2016/0358103 | A1* | 12/2016 | Bowers | G06F 9/4881 |
| 2017/0076246 | A1* | 3/2017 | Volkov | G06Q 10/0633 |
| 2017/0264710 | A1* | 9/2017 | Muntés Mulero | H04L 67/141 |
| 2018/0081722 | A1* | 3/2018 | Kirchner | G06F 9/5088 |
| 2018/0113742 | A1 | 4/2018 | Chung et al. | |
| 2018/0268296 | A1 | 9/2018 | Zheng et al. | |
| 2019/0026634 | A1 | 1/2019 | Homeyer et al. | |
| 2019/0050714 | A1 | 2/2019 | Nosko et al. | |
| 2019/0205792 | A1* | 7/2019 | Huang | G06F 9/4881 |
| 2021/0026687 | A1* | 1/2021 | Miller | G06F 9/5038 |
| 2021/0117869 | A1* | 4/2021 | Plumbley | G06F 18/217 |
| 2021/0232990 | A1* | 7/2021 | Maunz | G01C 11/00 |

OTHER PUBLICATIONS

Singh et al, "A Machine Learning Approach for Modular Workflow Performance Prediction", Works'17, Nov. 12-17, 2017, ACM, pp. 1-11 (Year: 2017).*

* cited by examiner

SYSTEMS AND METHODS FOR PROVIDING MANAGEMENT OF MACHINE LEARNING COMPONENTS

TECHNICAL FIELD

The subject matter of this disclosure relates to machine learning models and more specifically to approach to managing the development, deployment and accessing of machine learning models.

BACKGROUND

Machine learning models are trained and stored both in cloud-based environments and on-premises environments. Once the model is trained and stored, the system serves the model from either an on-premises environment or one or more cloud environments. Specifically, a decision is made whether to serve the model from an on-premises environment or one or more cloud-based environments. The model can then be deployed from the selected environment for subsequent utilization.

Currently, the decision of whether to serve the model from a cloud environment or an on-premises environment is made manually by an administrator. This is, however, an inefficient use of an administrator's time and resources. Further, manual decision-making by a user regarding model serving can lead to improper serving of the model. Specifically, a number of factors dictate whether a trained model should be served from an on-premises environment or one or more cloud environments. These factors can vary widely across different model deployment scenarios and different end users. However, an administrator does not or is not otherwise capable of accounting for these various factors leading to incorrect model serving from an on-premises environment and vice versa, incorrect model serving from cloud environment. This issue related to a first aspect of this disclosure.

A second aspect of this disclosure relates to orchestration and cloud-based platforms that are usually done at a cluster level. A cluster is a virtual aggregation of servers normally providing a similar stack of hardware and software resources. Currently, a machine learning workflow is typically assigned to a single cluster and the entire workflows performed in the same heterogeneous cluster. This is problematic as different parts of a machine learning workflow have different requirements for performance, security, reliability, and so forth. For example, in a machine learning workflow involving model training, evaluation, application packaging and deployment, machine learning training jobs consume large amount of resources, while deployment of model resources consumes less amount of resources. Therefore, in order to complete the machine learning workflow in the same heterogeneous cluster, a cluster with enough resources to perform model training is dedicated to the machine learning workflow. However, tasks that utilize less resources, such as model deployment services, are still performing in the same dedicated cluster. In turn, this leads to resource wastage within the duster. For example, resources needed to perform machine learning training jobs are not needed to perform model deployment services are thereby wasted. Therefore, there exists a need for systems and methods of cluster assignment and management for machine learning workflows that reduces the amount of wasted resources.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
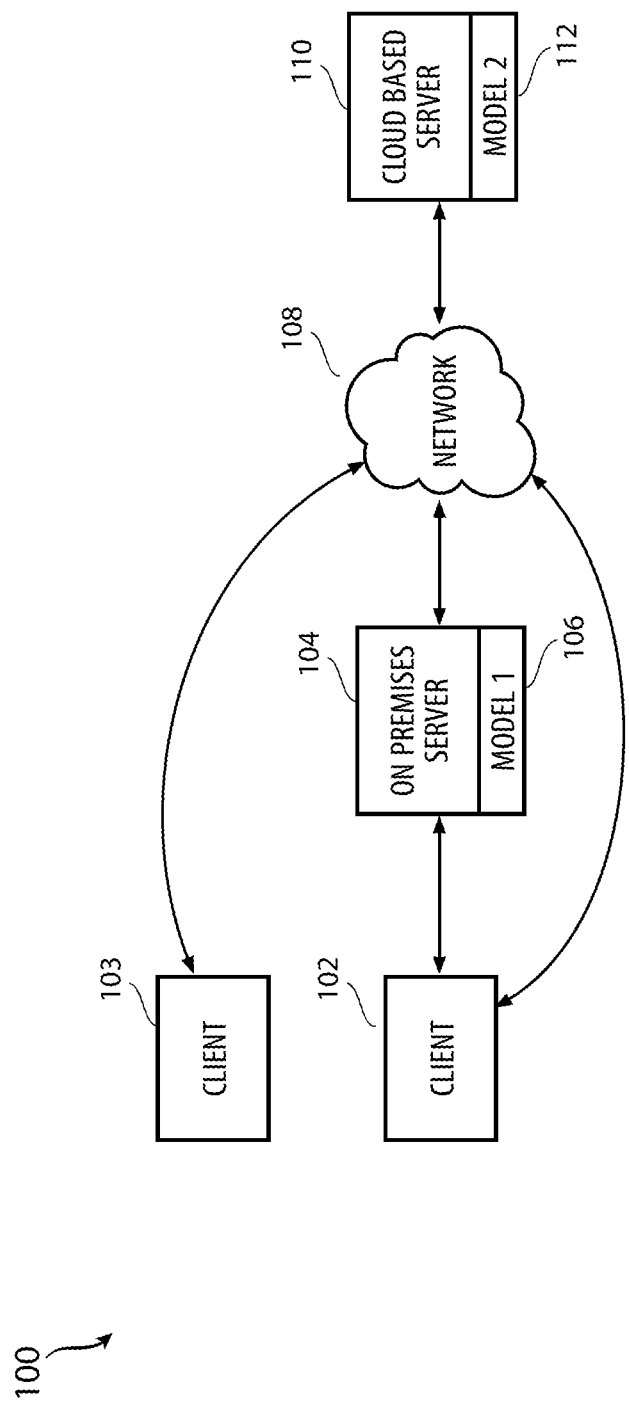
FIG. 1 illustrates a topology of a network in which the innovation disclosed herein can apply.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein. The present disclosure addresses several different solutions but both related to machine learning workflows and how to determine where training and deployed machine learning models are positioned within a network environment.

In a first aspect of this disclosure, the present disclosure introduces a new approach to manage both the training of the machine learning model and the deployment of the machine learning model. An example method includes receiving, at a workflow controller, a machine learning workflow, the machine learning workflow associated with a first task and a second task. In one aspect, the first task it can be training a machine learning model and the second task can relate to deploying the machine learning model. The method can include segmenting, by the workflow controller, the machine learning workflow into a first sub-workflow associated with the first task and a second sub-workflow associated with the second task, assigning a first workflow agent to the first sub-workflow and assigning a second workflow agent to the second sub-workflow, selecting, by the first workflow agent and based on first resources needed to perform the first task, a first cluster for performing the first task and selecting, by the second workflow agent and based on second resources needed to perform the second task, a second cluster for performing the second task.

A second aspect of this disclosure addresses the need for methods of cluster assignment and management for machine learning workflows that can reduce wasted resources. An example method includes establishing a local machine learning model on a local device, establishing a remote machine model on a remote, network-based device, receiving, at a serving model trained to determine whether to apply the local machine learning model or the remote machine model to a task, data associated with the task, based on the data, outputting from the serving model a determination to service the task from the local machine learning model or the remote machine learning model and, based on the determining, servicing the task from the local machine learning model or the remote machine learning model.

Description of Example Embodiments

Disclosed herein are systems, methods, and computer-readable media for innovations which focus on the ability to improve the process of determining whether to serve a machine learning model from an on-premises environment or from a cloud environment.

FIG. 1 illustrates the basic environment 100 which is addressed by the disclosure. Machine learning models can be trained and deployed at various locations within a network. In one scenario, assume that the client device 102 will seek to access the services of a machine learning model for such a process as speech recognition. The device 102 can utilize local servers 104 which can run a machine learning model 106 to provide the service. In another aspect, the client 102 can access through a network 108 a cloud-based server 110 which can have a deployed machine learning model 112. At issue is how an efficient approach can be introduced for training a respective model and deploying respective model on one of an on-premises device 104 or cloud-based device 110.

Model serving parameters can dictate how to serve a model, such as whether to serve the model from an on-premises environment 104 or cloud-based environment 110 and can include one or more parameters. For example, latency related to serving the model and application of the model can be a factor. If low latency is critical in actually running or applying the model, then it becomes more desirable to serve the model from a location such as an on-premises network environment 104. Such an environment is closer to the origin of the device 102 requesting the model or use of the model.

In another aspect, characteristics of the origin of the device 102 requesting the model can be a factor. For example, if the device 102 requesting the use of the model is distributed across distinct geographical locations, then it might be more desirable to serve the model from one or more cloud environments 110 for more efficient resource usage. Furthermore, in this particular example, serving the model from the cloud environment 110 might increase latency associated with serving the model. However, the achieved benefits from the standpoint of a resource usage prospective might outweigh the increase latency.

In another aspect, resource requirements associated with serving model might be a factor. If a throughput of inference or batch inference in model serving is a significant factor, then it might be more desirable to serve the model from a cloud-based environment 110 as the cloud environment typically has higher amounts of computer resources and or more powerful resources available such as GPUs, TPUs, etc. for serving models.

Another aspect that might be taken into account as the warm up time of the model. Specifically, if a warm up time is a significant factor, then it might be better to serve the model from a location where the model is actually trained. For example, if training is completed in an on-premises environment 104, it might take a significant amount of time to a copy of the model to a cloud environment 110 and then start serving. For example, if training is completed in on-premises environment 104 which has to then be served using a Google artificial intelligence platform, for example, the model has to upload to cloud storage bucket is a prerequisite. See, https://cloud.google.com/ml-engine/docs/deploying-models. Similarly, for Amazon Web Services (AWS), the model should be in a S3 path to get deployed. See, https://docs.aws.amazon.com/sagemaker/latest/dg/how-it-works-hosting.html.

Security associated with the model is also an important factor. If security associated with the model is a significant factor, then it can be desirable to decrease the chances that the model requests and the actual model are exposed externally or outside of an on-premises environment 104. For example, clients 102 might want to refrain from exposing a model that is trained on their own data. Therefore, it might be desirable to train the model in the on-premises environment 104 and then serve the model directly from the on-premises environment 104 for security purposes.

In order to decide whether to serve a model from an on-premises environment or one or more cloud-based environment 110, a separate model, herein referred to as a serving model, can be trained based on varying values of model serving parameters. For example, the model can be trained to account for various throughput requirements of model serving. The serving model can be trained by giving varying weights to the model serving parameters used to train the serving model. Specifically, scores can be assigned to the model serving parameters for weighting the parameters differently when determining whether to serve the trained model from an on-premises environment 104 or cloud-based environment 110. Furthermore, the scores can be dynamically adjusted to affect how the serving model is actually applied. For example, in one application of the serving model, security can be weighted more greatly than in a different application of the serving model The serving model can then be applied to a particular instance of serving a trained model to determine whether to serve the trained model from a cloud environment 110 or an on-premises environment 104. The serving model can be applied to model serving parameter input related to an instance of actually serving the train model. Model serving parameter input can vary across different instances of starting serving the train model. For example, in one instance, the input can include that the model will be served to a single requesting endpoint. In another instance, the input can include that the model will be served to multiple requesting endpoints in geographically separate locations. Accordingly, results of application of the serving model can vary across the instant instances. For example, when the trained model will be served to a single endpoint, the serving model can identify serving the trained model from an on-premises environment 104. Further in the example, when the trained model will be served to multiple endpoints 102, 103, the serving model can identify serving the trained model from one or more cloud environments 110.

Figure 2:
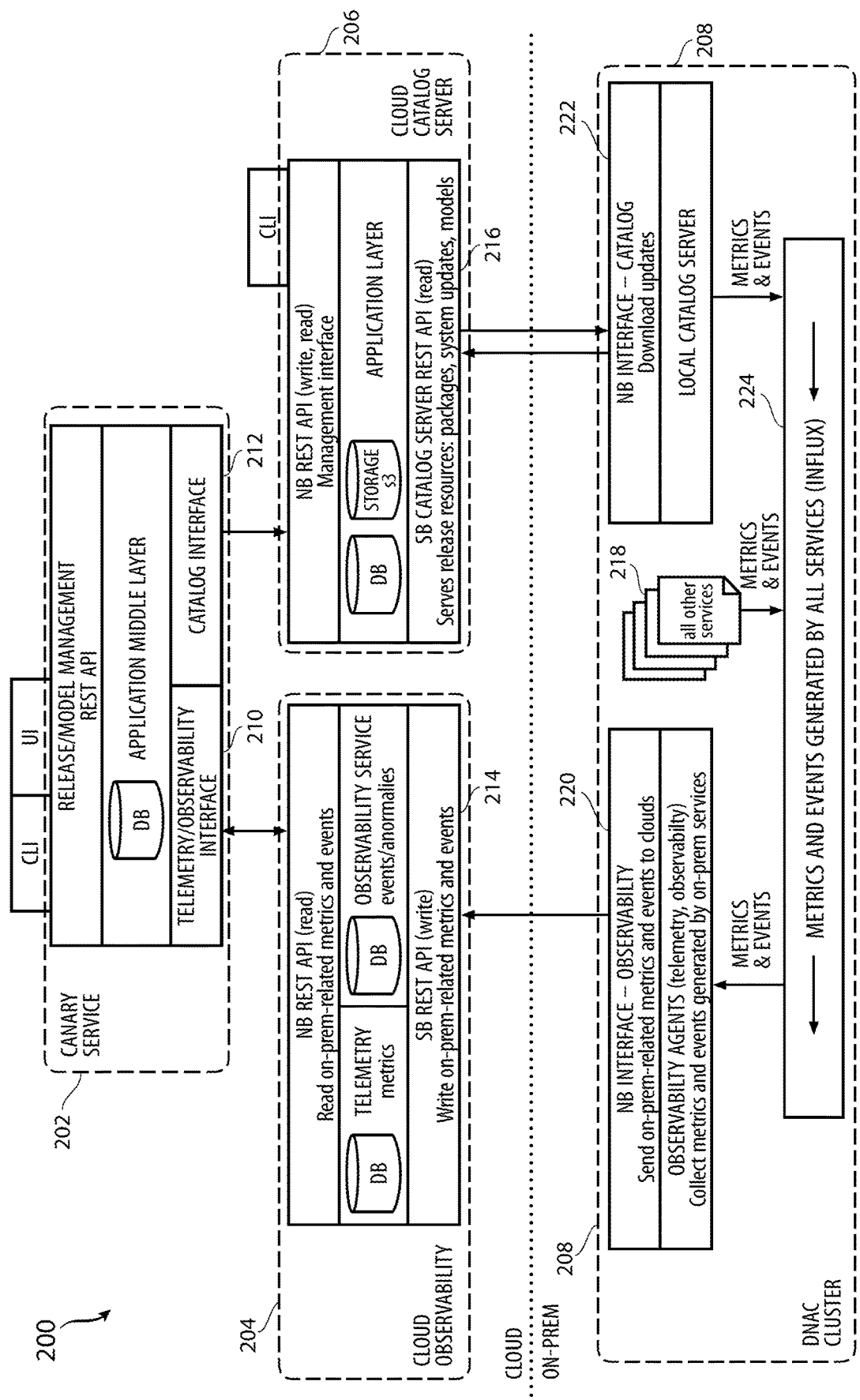
FIG. 2 illustrates another network topology.

The model serving techniques described herein can be applied to many products. Specifically, the model serving techniques described herein can be applied to Cisco's DNA (Digital Network Architecture) related technology. For example, the model serving techniques can be integrated with DNA to control policy-based package deployment and updates and deployments of models. The current DNAC (Digital Network Architecture Center) platform uses a software catalog infrastructure to deliver artifacts of different types and versions to various on premises and cloud offerings. These artifacts include the software package tarballs, X images, configuration artifacts, and so forth. DNAC software catalog systems use a software canary service driven policy-based approach to deliver these artifacts. The DNAC the software catalog and canary service will be extended to support delivery of different versions of the models to be served. Version awareness and policy-based delivery of artifacts is important to the concept of DNAC catalog and canary services. The architectural diagram in FIG. 2 represents the interactions between on premises DNAC cluster and cloud catalog/canary and observability services. The concept is applicable to cloud and hybrid offers as well.

FIG. 2 shows an architecture 200 including a canary service 202 which includes a number of components such as a command line interface (CLI), a user interface (UI), a release or model management or REST API components, and application metal layer or database, and the telemetry observability interface 210 and the catalog interface 212. The canary service 202 can manage a model life cycle such as create releases and defined user accesses and policies. The service can monitor model performance at a deployment level globally. The service 202 can perform a "canary analysis" on models based on incoming data from observability. This can allow the administrator to phase out a model in order to analyze impact with a subset of users first.

Prior to continuing with the primary concepts disclosed herein, this disclosure next provides an introductory discussion to the concepts and technologies for providing verifiable proof of integrity of network nodes traversed by packets. These can be referred to as "canary stamps" and the concepts can apply generally to the canary service 202 shown in FIG. 2.

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic typically traverses a number of nodes that route the traffic from a source node to a destination node.

While having numerous nodes can increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., packet processing, security or policy compliance verification, routing, etc.) on the packet and that the packet has traversed the network nodes.

Some security approaches can aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or proof of integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both to offer a secure approach that allows network users or entities to verify that traffic has traversed a defined set of nodes and that such nodes have not been compromised.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices and maintain these logs in trusted storage. These logs can be protected by embedding a private key into every trust anchor produced for a hardware device and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, metadata elements containing security measurements or evidence, can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a canary stamp associated with the device. A canary stamp can indicate or otherwise include a signed measurement associated with a device for verifying trustworthiness of the device. In turn, such measurements can be referred to as canary stamps because each signed measurement is like a stamp proving its authenticity, and like a canary in a coal mine that indicates an early sign of trouble. Such verifiable evidence can be appended or included in packets transmitted by nodes on a network. The metadata elements can thus be used to evaluate the trustworthiness of a node(s) and react accordingly. For example, a device or entity can review metadata element associated with a node to determine that the node should not be trusted and adjust a network policy to mitigate possible damage.

In some implementations, dedicated cryptoprocessors, such as a processor in TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is an arbitrary number that can be used to introduce randomness. In some instances, a nonce can be used just once in a cryptographic communication. Further, a nonce can be passed into a TPM and/or incorporated into a canary stamp/metadata. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, metadata elements, e.g. canary stamps, and tokens can be created by extracting current counters (e.g., clock, reset, restart) from a node's TPM, and incorporating such counters and security measures taken from the node into a packet. In some examples, the current counters and/or security measures can be hashed with information within an external TPM. The metadata elements and tokens can thereby provide a non-spoofable token or metadata element, which can bind continuously incrementing counters on an attestee with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of the metadata elements, e.g. canary stamps, and/or tokens can mean that a receiver should have the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, the metadata elements, e.g. canary stamps, and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, a testation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, metadata elements and tokens containing or reflecting security measures are used as previously mentioned to validate the integrity of a node and perform continuous evaluation of node integrity. Thus, the metadata elements and tokens described herein can be used to provide proof of transit through uncompromised nodes.

In some examples, the metadata elements and tokens can be added as additional metadata to packets that traverse a network where proof of transit via uncompromised nodes is desired. Various strategies can be implemented for transporting the metadata elements and tokens in a packet. In some cases, the metadata elements and tokens can be carried within an In-Situ (or in-band) Operations, Administration and Management (IOAM) data field.

In some implementations, the metadata elements and tokens can be carried with IOAM trace data. For example, a canary stamp can be carried as part of an IOAM data field in a variety of encapsulation protocols such as, for example and without limitation, IPv4, IPv6, NSH (Network Service Header), etc. In some cases, the canary stamp can be carried in an IOAM data field as an IOAM Trace option data element (e.g., with an IOAM Trace type for node integrity canary stamp). A metadata element, token, or digest, e.g. canary stamp digest, can be added in the IOAM trace option of a packet by each node that forwards the packet.

When the packet reaches a node (e.g., the destination node and/or an intermediate node) that removes IOAM metadata (e.g., an IOAM decapsulating node), the validity of the metadata element and/or token in the packet can be verified to determine that the packet traversed uncompromised nodes. In some examples, since canary stamps are time bound, the packet trace timestamps defined in IOAM can be used to validate the canary stamp in the time window the packet traversed that node.

Verification can be performed without placing a large transactional load on the verifier or a device, such as a controller, that will ultimately validate the security measurements associated with the metadata elements or tokens. This is because the measurement values can often chance infrequently. The verifier may only need to validate a metadata element and/or token carried within an IOAM data trace whenever the associated security measurements associated change (e.g., a verifier may only need to check with a controller whenever it sees a node's TPM extends a PCR value which was not previously confirmed by the verifier).

In some cases, when only the time ticks within a signed metadata element increases, only the signature of the metadata element is validated. To do this, the verifier may use the public key of any node which can place a metadata element. Such signature validation can be done without using a controller to verify the measurements.

In another example, a packet can carry IOAM POT data with space optimization of metadata element values, e.g. canary stamp values. For example, a new IOAM POT data field can carry a canary stamp or a hash extend of a canary stamp and, in turn, canary stamp data can be carried across nodes. In some cases, a canary stamp hash extend can be a similar method as PCR extend operation performed by TPMs.

In some cases, the canary stamp hash can provide a one-way hash so that a canary stamp recorded by any node cannot be removed or modified without detection. IOAM proof of transit option data for a canary stamp digest can be defined by a hash algorithm (e.g., 20 octets with SHA1, 32 octets with SHA 256, etc.). In some implementations, each node along a path of the packet can forward the packet with a new or updated canary stamp digest. In some examples, the new or updated canary stamp digest can be generated by a node as follows: IOAM canary stamp digest new value=Digest of (IOAM canary stamp digest old value||hash (canary stamp of the node)), where the IOAM canary stamp digest old value can refer to the canary stamp digest included in the packet by one or more previous hops.

Moreover, in some cases, a Per Packet Nonce (PPN), where PPN changes per packet and is carried as another field within the IOAM metadata option, can be added to provide robustness against replay attacks. To illustrate, in some examples, a PPN can be added as follows: IOAM canary stamp digest new value=Digest of (IOAM canary stamp digest old value||hash(canary stamp of the node||PPN)). A node creating the new value for the IOAM canary stamp digest can thus take the value of any previous IOAM canary stamp digest and extend/hash that value with the node's current canary stamp. The result of the concatenation and hashing can then be written into IOAM POT data (or other IOAM data fields) as the new IOAM canary stamp digest.

At the verifier (e.g., the device verifying the canary stamp data), the same operation can be performed over expected canary stamp values calculated for the nodes that are traversed in the time window when the packet was forwarded. A verifier can be an inline device or a centralized device. Moreover, in some examples, nodes that are expected to be traversed can be identified using IOAM tracing, routing state or by sending active probes. A match between the value of POT data carrying specific metadata elements, e.g. a canary stamp digest and the expected canary stamp value, can prove that the packet traversed through trusted or uncompromised nodes.

In some examples, one or more strategies can be implemented to optimize metadata element validation. For example, metadata elements, e.g. canary stamps, can detect attempts of a replay attack by embedding a nonce as well as TPM or TPM2 counters (e.g., clock, reset, restart). In some cases, this nonce can be part of the metadata elements and different from the PPN described above.

The nonce is relevant to a receiver as the interval from the nonce's creation time to the first stamp received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize metadata element or token validation across nodes, the following approaches can be implemented to deliver synchronization information from a central component to each node and the verifier. For example, a central server can broadcast or multicast centralized nonce values (e.g., tracked random numbers), Each node can pick up the latest nonce and use it to attest a value. A verifier can know the freshness of a metadata element or token it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its metadata element. To get attested time, a TUDA (Time-Based Uni-Directional Attestation) scheme such as the TUDA scheme described in https://tools.ietf.org/id/draft-birkholz-i2nsf-tuda-01.html, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the metadata element as the nonce can be replaced by the TUDA time-synchronization token. This approach may also implement a central timestamp authority as per TUDA. In some examples, for each hop, a canary stamp digest value can be: IOAM canary stamp digest new value||Digest of (IOAM canary stamp digest old value||hash(canary stamp of the node||TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received. Further, in some cases, this approach can be implemented without also carrying a PPN or without synchronizing a nonce across nodes as previously described.

Further, an attestor, e.g. a node or a verifier, can use random numbers, otherwise pseudo-random numbers, created by peers and/or the attestor to generate and verify attestation information. Specifically, the attestor can accumulate random numbers from one or more layer 2 peers. The random numbers can be accumulated from the peers over a specific amount of time, e.g. a short duration of time. In turn, the random numbers can be combined into a number through an applicable technique, e.g. a Bloom filter. This number can serve as a nonce for a cryptoprocessor for generating a result. As follows, the layer 2 peers, potentially including the attestor, can use the result created by the cryptoprocessor, to verify/validate that their corresponding provided random number was used in generating the nonce ultimately used by the cryptoprocessor to create the result. In turn, the layer 2 peers, potentially including the attestor, can generate verified attestation information based on the random numbers generated by the peers, the nonce created from the random numbers, and/or the result created by the cryptoprocessor from the nonce.

Having discussed the concept of canary stamps, this disclosure continues a discussion with reference to FIG. 2. FIG. 2 shows a telemetry or observability interface 210 that can get information on a health of deployments from the cloud observability component 204. This component includes a northbound REST API that reads data on premises related metrics and events and includes components for a telemetry metrics observation and observed observability service of the events and abnormalities. There is also a southbound REST API component 214 which can write on-premises related metrics and events.

The canary service 202 also includes a catalogue interface 212 that can define and create releases or model versions, in figure user groups to have access, and remove packages or models and their artifacts, and manages her access to releases in models. This interface can communicate with the cloud catalogue server 206. The catalogue server 206 can include a northbound REST API for reading and writing data and for management interface, can include a CLI, and an application layer as well. A southbound catalogue server REST API can provide read capability and serves release resources packages system updates in models. The components 204, 206 are part of the cloud infrastructure.

The lower portion of FIG. 2 shows on-premises components DNAC cluster 208. This cluster can include a northbound interface for observability 220. The north bound interface 220 can send on-premises related metrics and events 224 to the cloud observability component 204. Also included in the DNAC cluster 208 can be observability agents for telemetry and observability and can collect metrics and events 224 generated by on-premises services 218. Any number of other services 218 can provide metrics and events 224 which can be generated by the various services and reported to the observability agents within the MAC cluster 208.

In the cloud catalogue server 206, a southbound catalogue server REST API 216 can serve release resources such as packages, system updates and models for release associated with local catalogue metadata and user allowance to a northbound interface or catalogue 222 within the DNAC 208. The local catalogue server can receive these updates and provide information regarding metrics and events. The local catalogue server can send on-premises cluster metadata 224 at every request such as member IDs, cco's, beta consent, etc.

Figure 3:
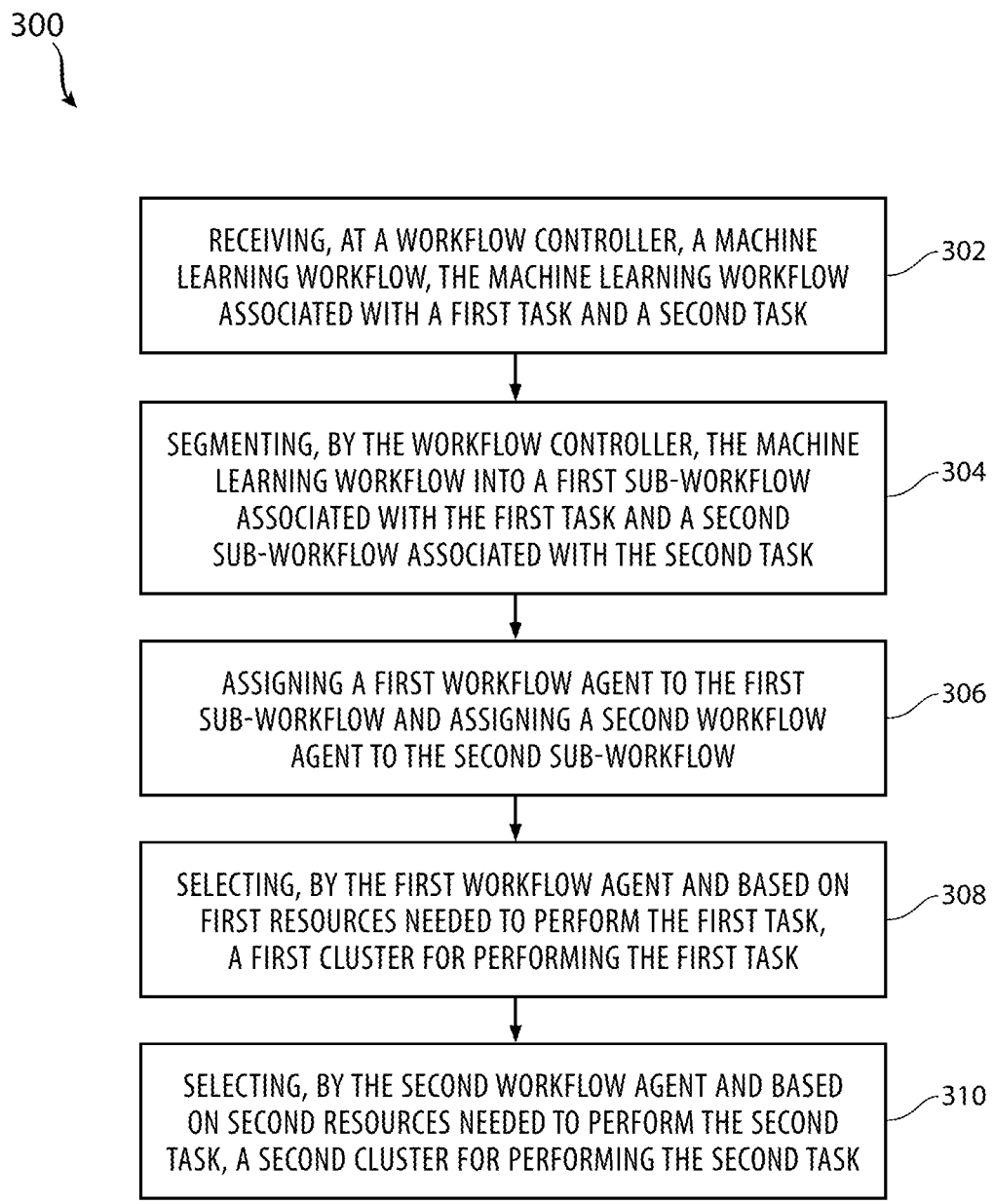
FIG. 3 illustrates a method embodiment from the standpoint of a central controller.

FIG. 3 illustrates a method aspect of this disclosure. A method aspect includes receiving, at a workflow controller, a machine learning workflow, the machine learning workflow associated with a first task and a second task (302), segmenting, by the workflow controller, the machine learning workflow into a first sub-workflow associated with the first task and a second sub-workflow associated with the second task (304), assigning a first workflow agent to the first sub-workflow and assigning a second workflow agent to the second sub-workflow (306), selecting, by the first workflow agent and based on first resources needed to perform the first task, a first cluster for performing the first task (308) and selecting, by the second workflow agent and based on second resources needed to perform the second task, a second cluster for performing the second task (310).

The first task can in one example include training a machine learning model. The second task can include, for example, deploying the machine learning model. The method can include deploying the first task on the first cluster and deploying the second task on the second cluster. In one aspect, the workflow controller generates the first workflow agent and the second workflow agent. In another aspect, the selecting, by the first workflow agent and based on first resources needed to perform the first task, the first cluster for performing the first task is further based on selecting the first cluster to minimize resource use to perform the first task.

The selecting, by the second workflow agent and based on second resources needed to perform the second task, of the second cluster for performing the second task can further be based on selecting the second cluster to minimize resource use to perform the second task. The workflow controller can operate in a master cluster which is separate from the first cluster and the second cluster. The first cluster and the second cluster can be different clusters having different characteristics, which differences can be hardware based or software based or a combination of both.

The method can include, when the workflow controller is stopped or deleted: stopping or deleting the first workflow agent and stopping or deleting the second workflow agent. The method can include one or more of these steps.

Figure 4A:
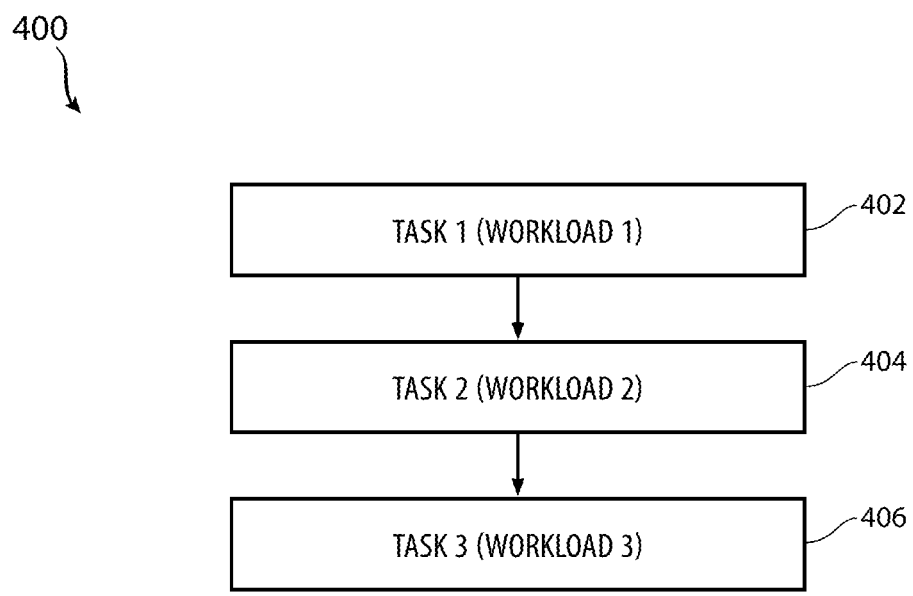
FIGS. 4A-4C illustrate a method embodiment from the standpoint of a network device.
Figure 4B:
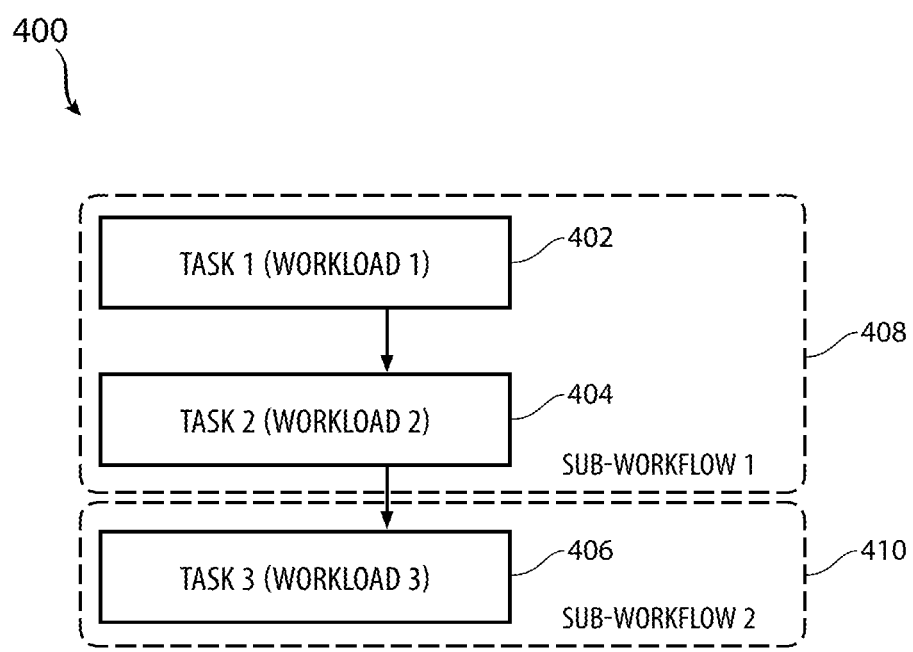
Figure 4C:
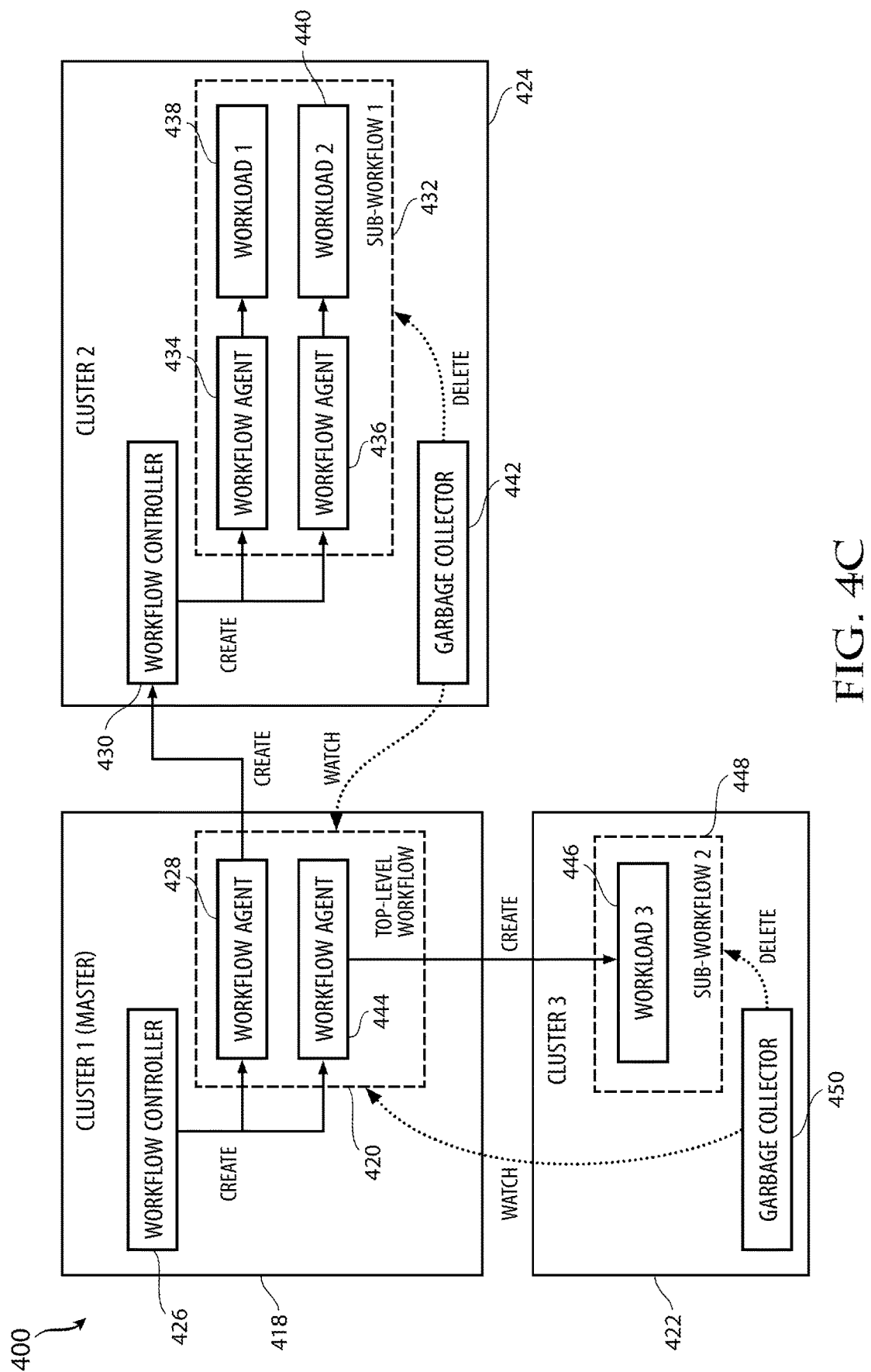

FIGS. 4A-4C illustrate the approach of creating sub-workflows in connection with machine learning models. FIG. 4A shows a series of tasks which includes a first task 402 having a first workload associated with the task, a second task 404 with the second workload, and a third task 406 with each separate workload. The approach disclosed herein provides for systems and methods for assigning and controlling of machine learning workflow across multiple clusters. In assigning the workflow to multiple clusters, the amount of resources wasted in performing the machine learning workflow can be reduced. Specific portions of the machine learning workflow can be assigned to an appropriately-sized cluster based on resources needed to complete the different portions of the machine learning workflow.

For example, a model training portion of the machine learning workflow can be performed by a larger cluster while a model deployment of the machine learning workflow can be performed on a smaller cluster. These assignments can ensure that the proper cluster resources are utilized during the overall machine learning workflow.

As shown in FIG. 4A, a workflow consist typically of a plurality of tasks where each task corresponds to a workload to be applied to a cluster. For example, a machine learning training job can be one task in a model service and model deployment can be another task. One or more adjacent tasks that are executed either in sequence or in parallel in the same cluster can be grouped up as a sub-workflow.

FIG. 4B illustrates the first two tasks 402 and 404 being combined into a sub-workflow 408. The third task 406 and its associated workload is assigned as a second sub-workflow 410.

FIG. 4C illustrates in more detail the approach. A workflow controller 426 within a cluster 418 can control the execution sequence of workflow tasks in a cluster and the segmentation of the workflow into different sub-workflows. For example, the workflow controller 426 can segment the workflow into two different sub-workflows—one with the model training task and one with the model deployment task. In FIG. 4C, the top level workflow 420 can be created by the workflow controller 426 to include a first workflow agent 428 and a second workflow agent 444. Workflow agent 428 can create in a second cluster 424 another workflow controller 430 which can then create a workflow agent 434 and a second workflow agent 436. The first workload 438 can be managed by the workflow agent 436 and the second workload 440 can be managed by the workflow agent 436, both of which can combine to be defined as a second sub-workflow 432.

The top level workflow 420 can include the creation of another workflow agent 444 from the workflow controller 426. That workflow agent can create another workflow controller (not shown) in another cluster 422 for managing a third workload 446. In this respect, a first sub-workflow 432 is implemented or utilizes resources from a cluster 424 while the second subworkflow 448 consumes resources in a different cluster 422. In this manner, the workflow that can consist of multiple tasks in be segmented and assigned to different clusters according to the characteristics of the workflow and other components. As shown in FIG. 4C, where a sub-workflow includes multiple tasks, a separate workflow controller 430 can be created to manage the segmentation of that workflow into multiple other sub-workflows. Once the plurality of workflow agents are created, they function to manage orchestrated orchestration of the tasks segmented by the workflow controller 426. Specifically, a workflow agent can assign a task to a worker cluster and manage performance of the task by the worker cluster. Each task can have its own specific workflow agent that effectively becomes a controller for that particular task. The workflow agents can select a proper worker cluster for a task based on resources needed to complete the task. Specifically, for machine learning training task, a workflow agent can select a worker cluster with enough resources to perform the machine learning training task. Furthermore, the workflow agents can select a worker cluster to minimize or otherwise eliminate the amount of wasted resources in performing the task. For example, a workflow agent can select a worker cluster that has just enough resources to perform a task in a machine learning workflow.

The workflow can be updated during runtime. Updates are first received by the workflow controller 426 in the master cluster 418 and then propagated to other clusters 424, 422 through workload agents 434, 436.

A garbage collector 442, 450 can operate in each respective cluster 424 which watches the status of the top level workflow 420 in the master cluster 418. If the top level workflow 420 is stopped or deleted, the garbage collector 442, 450 automatically stops and deletes the sub-workflows 440, 448 that work in a corresponding respective worker cluster.

In this manner, a machine learning workflow can be performed across multiple clusters to adapt to different requirements of each task in the workflow. Specifically, tasks in the machine learning workflow can be assigned to different clusters based on expected requirements available resources of the different clusters. Other factors can be included as well such as timing, costs of use of the cluster, geographic location of a cluster, energy usage of different clusters, and so forth.

Figure 5:
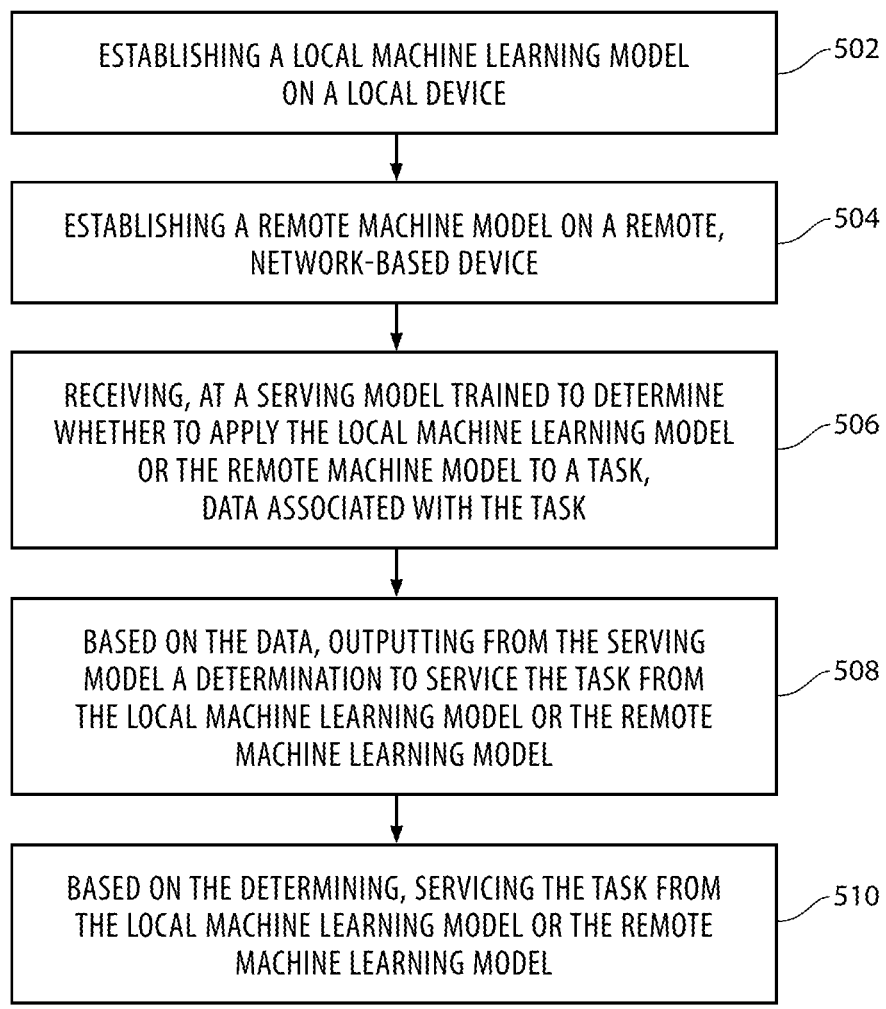
FIG. 5 illustrates a method embodiment from the standpoint of a network switch.

FIG. 5 illustrates an example method. A method can include establishing a local machine learning model on a local device (502), establishing a remote machine model on a remote, network-based device (504), receiving, at a serving model trained to determine whether to apply the local machine learning model or the remote machine model to a task, data associated with the task (506), based on the data, outputting from the serving model a determination to service the task from the local machine learning model or the remote machine learning model (508) and based on the determining, servicing the task from the local machine learning model or the remote machine learning model (510).

The data can include one or more of: latency related to using the local machine learning model or the remote machine learning model, characteristics of an origin of the task, resource requirements for servicing the task, warm up times for the local machine learning model and the remote machine learning model, throughput requirements associated with the local machine learning model and the remote machine learning model, and security associated with the local machine learning model and the remote machine learning model. The data associated with the task can relate to how many endpoints will the local machine learning model or the remote machine learning model will be serving. The data associated with the task can relate to a geographic configuration of one or more endpoints that the local machine learning model or the remote machine learning model be serving. The serving model can be trained by giving varying weights to first parameters associated with the local machine learning model and second parameters associate with the remote machine learning model. The varying weights can be dynamically adjusted based on how the local machine learning model or the remote machine learning model is actually applied. In another aspect, the data associated with the task can relate to a warm up time for a respective model and whether the respective model can be served from a same location as the model was trained.

Figure 6:
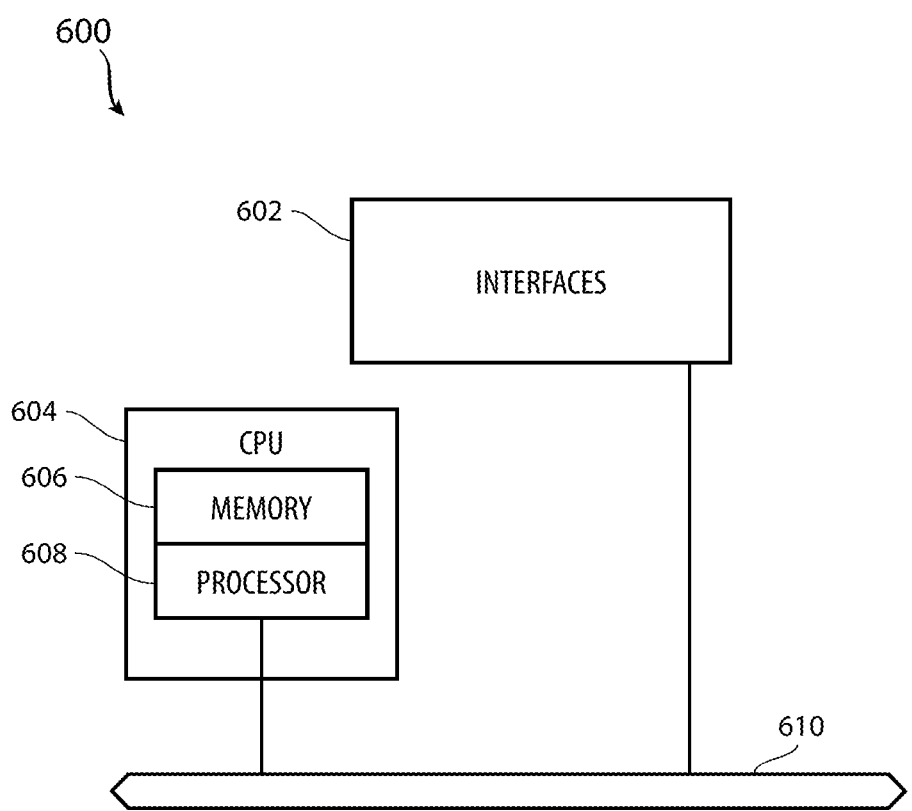
FIG. 6 illustrates an example network device in accordance with various examples.

FIG. 6 illustrates an example network device 600 suitable for implementing aspects of this disclosure. In some examples, the control plane 310 and/or the component 318 may be implemented according to the configuration of the network device 600. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, processor 608 can be specially designed hardware for controlling the operations of the network device 600. In some cases, a memory 606 (e.g., non-volatile RAM, ROM, etc.) also forms part of the CPU 604, However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WiFi interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
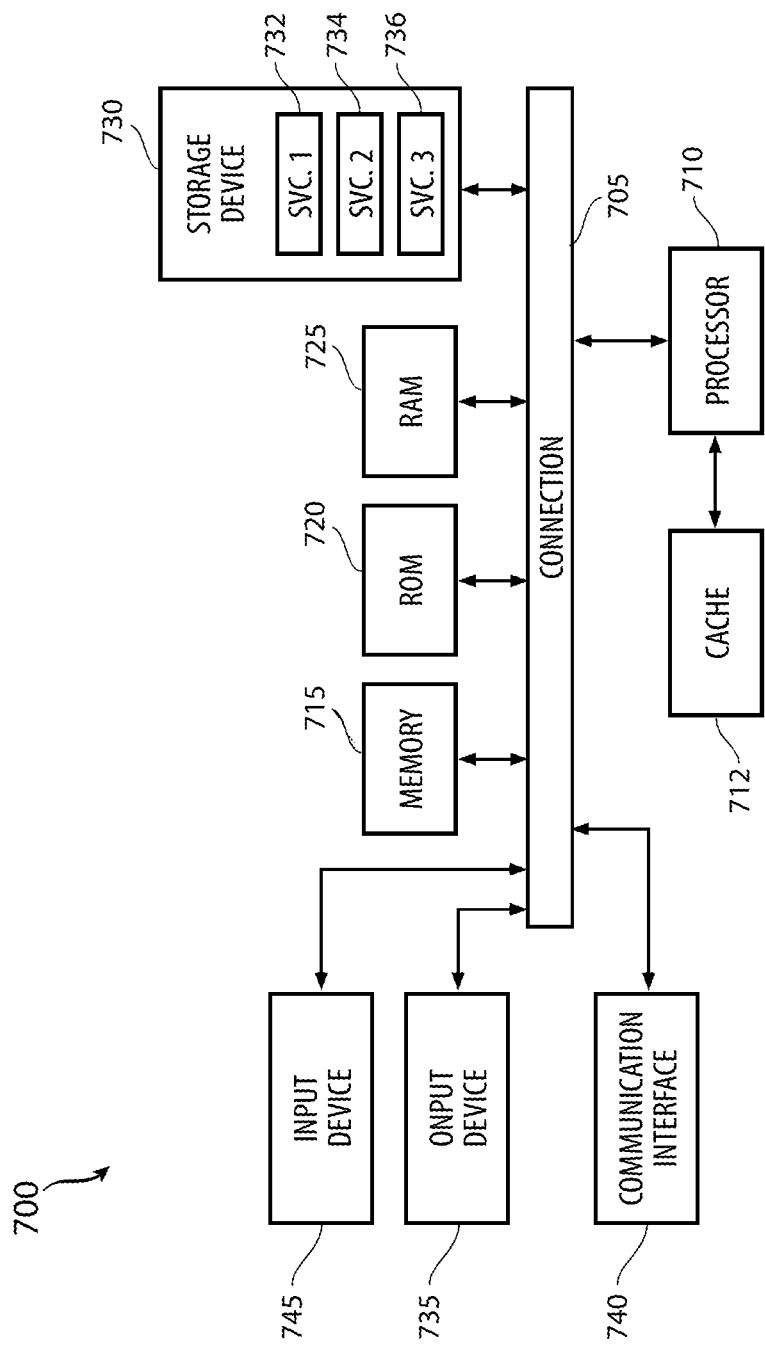
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732 service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks including devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:
1. A method comprising:
 receiving, at a workflow controller, a machine learning workflow, the machine learning workflow associated with both training the machine learning model and deploying the machine learning model;

segmenting, by the workflow controller, the machine learning workflow into a first sub-workflow associated with training the machine learning model and a second sub-workflow associated with deploying the machine learning model;

assigning a first workflow agent to the first sub-workflow and assigning a second workflow agent to the second sub-workflow;

selecting, by the first workflow agent and based on first resources needed to train the machine learning model, a first cluster for performing the first sub-workflow, wherein the first cluster for performing the first sub-workflow is configured to meet a first set of requirements for a first amount of compute resources, a first performance requirement, a first security requirement and a first reliability requirement; and selecting, by the second workflow agent and based on second resources needed to deploy the machine learning model, a second cluster for performing the second sub-workflow, wherein the second cluster for performing the second sub-workflow is configured to meet a second set of requirements for a second amount of compute resources, a second performance requirement, a second security requirement and a second reliability requirement, wherein the first amount of compute resources is larger than the second amount of compute resources.

2. The method of claim 1, further comprising:
deploying the first sub-workflow on the first cluster; and
deploying the second sub-workflow on the second cluster.

3. The method of claim 1, wherein the workflow controller generates the first workflow agent and the second workflow agent.

4. The method of claim 1, wherein selecting, by the first workflow agent and based on first resources needed to perform the first sub-workflow, the first cluster for performing the first sub-workflow is further based on selecting the first cluster to minimize resource use to perform the first sub-workflow.

5. The method of claim 1, wherein selecting, by the second workflow agent and based on second resources needed to perform the second sub-workflow, the second cluster for performing the second sub-workflow is further based on selecting the second cluster to minimize resource use to perform the second sub-workflow.

6. The method of claim 1, wherein the workflow controller operates in a master cluster which is separate from the first cluster and the second cluster.

7. The method of claim 1, wherein the first cluster and the second cluster are different clusters having different characteristics.

8. The method of claim 1, further comprising:
when the workflow controller is stopped or deleted:
stopping or deleting the first workflow agent; and
stopping or deleting the second workflow agent.

9. A system comprising:
a processor; and
a computer-readable storage device storing instructions which, when executed by the processor, cause the processor perform operations comprising:
receiving, at a workflow controller, a machine learning workflow, the machine learning workflow associated with training both the machine learning model and deploying the machine learning model;
segmenting, by the workflow controller, the machine learning workflow into a first sub-workflow associated with training the machine learning model and deploying the machine learning model;
assigning a first workflow agent to the first sub-workflow and assigning a second workflow agent to the second sub-workflow;
selecting, by the first workflow agent and based on first resources needed to train the machine learning model, a first cluster for performing the first sub-workflow, wherein the first cluster for performing the first sub-workflow is configured to meet a first set of requirements for a first amount of compute resources, a first performance requirement, a first security requirement and a first reliability requirement; and
selecting, by the second workflow agent and based on second resources needed to deploy the machine learning model, a second cluster for performing the second sub-workflow, wherein the second cluster for performing the second sub-workflow is configured to meet a second set of requirements for a second amount of compute resources, a second performance requirement, a second security requirement and a second reliability requirement, wherein the first amount of compute resources is larger than the second amount of compute resources.

10. The system of claim 9, wherein the computer-readable storage device stores additional instructions which, when executed by the processor, cause the processor to perform further operations comprising:
deploying the first sub-workflow on the first cluster; and
deploying the second sub-workflow on the second cluster.

11. The system of claim 9, wherein the workflow controller generates the first workflow agent and the second workflow agent.

12. The system of claim 9, wherein selecting, by the first workflow agent and based on first resources needed to perform the first sub-workflow, the first cluster for performing the first sub-workflow is further based on selecting the first cluster to minimize resource use to perform the first sub-workflow.

13. The system of claim 9, wherein selecting, by the second workflow agent and based on second resources needed to perform the second sub-workflow, the second cluster for performing the second sub-workflow is further based on selecting the second cluster to minimize resource use to perform the second sub-workflow.

14. The system of claim 9, wherein the workflow controller operates in a master cluster which is separate from the first cluster and the second cluster.

15. The system of claim 9, wherein the first cluster and the second cluster are different clusters having different characteristics.

16. The system of claim 9, wherein the computer-readable storage device stores additional instructions which, when executed by the processor, cause the processor to perform further operations comprising:
when the workflow controller is stopped or deleted:
stopping or deleting the first workflow agent; and
stopping or deleting the second workflow agent.

* * * * *